United States Patent [19]

Nagji et al.

[11] Patent Number: 5,424,051
[45] Date of Patent: Jun. 13, 1995

[54] PROCESS FOR THE REMOVAL OF CARBON DIOXIDE AND MERCAPTANS FROM A GAS STREAM

[75] Inventors: Moez M. Nagji, Rolling Meadows, Ill.; Keith R. Clark, Houston, Tex.; Robert F. Raymond, Arlington Heights, Ill.

[73] Assignee: UOP, Des Plaines, Ill.

[21] Appl. No.: 31,795

[22] Filed: Mar. 15, 1993

Related U.S. Application Data

[63] Continuation-in-part of Ser. No. 820,472, Jan. 14, 1992, abandoned.

[51] Int. Cl.$^6$ .................. B01D 53/48; B01D 53/52; B01D 53/62
[52] U.S. Cl. .................. 423/234; 423/243.01; 423/243.08; 95/139
[58] Field of Search .......... 423/243.08, 243.01, 423/230, 243.07, 234; 502/34; 95/139

[56] References Cited

U.S. PATENT DOCUMENTS

| | | | |
|---|---|---|---|
| 2,918,426 | 12/1959 | Quiquerez et al. | 208/206 |
| 2,966,453 | 12/1960 | Gleim et al. | 208/206 |
| 3,108,081 | 10/1963 | Gleim et al. | 252/428 |
| 3,252,892 | 5/1966 | Gleim | 208/206 |
| 3,654,144 | 4/1972 | Collins | 208/245 |
| 3,725,299 | 4/1973 | Turnock et al. | 502/34 |
| 3,751,878 | 8/1973 | Collins | 55/58 |
| 3,980,582 | 9/1976 | Anderson, Jr. et al. | 252/428 |
| 4,035,942 | 7/1977 | Sibeud et al. | 423/226 |
| 4,233,038 | 11/1980 | Tao | 95/139 |
| 4,259,301 | 3/1981 | Say | 423/228 |
| 4,290,913 | 9/1981 | Frame | 252/428 |
| 4,358,297 | 11/1982 | Eberly, Jr. | 55/62 |
| 4,522,793 | 6/1985 | Larson et al. | 423/230 |
| 4,649,032 | 3/1987 | Snavely et al. | 423/226 |
| 4,808,765 | 2/1989 | Pearce et al. | 423/229 |
| 4,830,733 | 5/1989 | Nagji et al. | 423/230 |
| 4,830,734 | 5/1989 | Nagji et al. | 423/230 |
| 4,897,180 | 1/1990 | Bricker et al. | 208/189 |
| 4,935,580 | 6/1990 | Chao et al. | 585/820 |
| 4,957,715 | 9/1990 | Grover et al. | 423/228 |
| 4,964,889 | 10/1990 | Chao | 55/58 |
| 5,045,515 | 9/1991 | Chao et al. | 502/67 |
| 5,089,034 | 2/1992 | Markovs et al. | 95/139 |
| 5,104,630 | 4/1992 | Holmes et al. | 423/243.08 |
| 5,244,643 | 9/1993 | Verachtert | 423/243.01 |

FOREIGN PATENT DOCUMENTS

| | | | |
|---|---|---|---|
| 80797 | 3/1971 | Germany | 423/230 |
| 7518881 | 7/1975 | Japan | 423/230 |
| 753734 | 8/1956 | United Kingdom | 208/206 |
| 553984 | 5/1977 | U.S.S.R. | 502/34 |
| 715126 | 2/1980 | U.S.S.R. | 423/243.07 |
| 1224300 | 4/1986 | U.S.S.R. | 858/823 |

OTHER PUBLICATIONS

UOP Merox Process, The Oil and Gas Journal, Oct. 26, 1959 edition, vol. 57, No. 44.

*Primary Examiner*—Michael Lewis
*Assistant Examiner*—Peter T. DiMauro
*Attorney, Agent, or Firm*—Thomas K. McBride; John G. Tolomei; Richard P. Silverman

[57] ABSTRACT

This invention relates to a process for treating a feed gas stream containing $CO_2$ and mercaptans by contacting the feed gas stream with a $CO_2$-selective adsorbent under conditions effective to produce a $CO_2$-depleted feed gas stream which is thereafter subjected to contact with an alkaline scrubbing solution under mercaptan absorption conditions effective to produce a mercaptan- and a $CO_2$-depleted product gas stream and a mercaptide-containing scrubbing solution. At least a portion of the product gas stream may be utilized to regenerate the $CO_2$-selective adsorbent and the mercaptide-containing scrubbing solution may be regenerated by contacting same with oxygen in the presence of an oxidation catalyst.

5 Claims, 4 Drawing Sheets

PROCESS FOR THE REMOVAL OF CARBON DIOXIDE AND MERCAPTANS FROM A GAS STREAM

CROSS-REFERENCE TO RELATED APPLICATIONS

The present application is a continuation-in-part of U.S. Ser. No. 820,472, filed Jan. 14, 1992, now abandoned.

BACKGROUND OF THE INVENTION

1. Field of the Invention

This invention pertains to the field of purifying fluid streams by the removal of carbon dioxide and at least sulfur compounds therefrom. More particularly, the present invention relates to an integrated process which involves the utilization of a primary adsorption for the selective adsorption of carbon dioxide and a process for the removal of mercaptan sulfur compounds from the fluid stream, which process provides for lower disposal costs and lower operating costs.

2. Discussion of Related Art

Many hydrocarbons contain sulfur in the form of mercaptans (thiols). Mercaptans are almost invariably present in refinery fuel gas, LPG, cracked gasolines, straight run gasolines, natural gasolines, and in heavier hydrocarbon distillates including, for example, kerosene and fuel oil.

These mercaptan components are objectionable mainly because of their strong odor, but also, in some cases, due to their objectionable chemical reaction with other hydrocarbons or fuel system components.

There have been many attempts to provide processes for the removal or conversion of mercaptans. Some of the earliest processes included treatment of the hydrocarbon fraction with caustic, clays, and hydrotreating. A significant improvement in the treating of hydrocarbon fractions was made when the UOP Merox Process was announced to the industry in 1959. The *Oil and Gas Journal*, in the Oct. 26, 1959 edition, contains a discussion of the Merox Process, and also of some prior art processes. The above-mentioned article is hereby incorporated by reference. This process used a catalyst which was soluble in caustic, or alternatively held on a support, to oxidize mercaptans to disulfides in the presence of oxygen and caustic.

In U.S. Pat. No. 3,108,081, there is disclosed a catalyst comprising an adsorptive carrier and a phthalocyanine catalyst for the oxidation of mercaptans. The teachings of this patent are incorporated by reference. This patent taught that a particularly preferred phthalocyanine was the sulfonated derivative, with the monosulfonate being especially preferred.

In commercial operation, a number of catalyst poisons or other deleterious materials are present in the hydrocarbon feed to the processing units provided for mercaptan removal or conversion. Trace amounts of acidic components such as carbon dioxide and $H_2S$ are frequently encountered.

Many refinery processes produce light gases which contain acid gases such as $CO_2$, COS and $H_2S$ and alkyl mercaptans. These processes include crude units, coking units, and fluid catalytic cracking units. Typically gas streams from these units are burned as fuel in the refinery or used in other process units. In the future, more stringent environmental regulations and the introduction of such streams into sensitive downstream processing systems will require the removal of sulfur compounds such as COS, $H_2S$, and alkyl mercaptans from such streams.

Accordingly, the treating arts have developed a number of ways of handling these materials. One way is to simply provide a large vessel, termed a "pre-wash," partially filled with dilute aqueous caustic, disperse the hydrocarbon containing trace acidic components into the aqueous caustic, and pass the hydrocarbon stream up through the vessel. Typically the entering hydrocarbon stream will enter the pre-wash vessel through a series of nozzles to insure that there is intimate contact of hydrocarbon with dilute caustic. Sometimes contact is obtained by circulating the caustic inventory with a pump to mix the caustic with entering hydrocarbon in the piping. The strength and quantity of the caustic solution used are generally adjusted so that very little of the weakly acidic mercaptans in the feed are absorbed by the caustic. Only the more acidic carbon dioxide, $H_2S$ and other trace acidic compounds are removed by the caustic pretreatment. When very low acid contents in the product are required, the pre-wash vessel may be followed by a sand filter coalescer which will remove entrained droplets of aqueous salts from the hydrocarbon stream being treated. However, a sand filter requires frequent attention to maintain its coalescing efficiency and sand is subject to chemical attack by basic aqueous solutions. Furthermore, the presence of both $H_2S$ and carbon dioxide in the hydrocarbon stream can affect the degree to which the caustic solution is consumed. The use of a caustic solution in the presence of $CO_2$ will be effective in preventing the breakthrough of the $CO_2$ up to the point when the caustic is 35–45% spent. Thus, there is a need for a process which improves the chemical utilization of the caustic and thereby reduces the requirements for disposal of spent caustic solution.

Other chemical processes for the treatment of hydrocarbon feeds containing sulfur compounds and acidic components have involved purely chemical reactions such as scrubbing with mono- or diethanolamine or countercurrent extraction using a hot potassium carbonate solution, and chemisorption methods in which iron oxide sponge or zinc oxide reacts with the sulfur compounds to form iron sulfide and zinc sulfide, respectively. A widely used chemical system for treating natural gas streams involves scrubbing with mono- or diethanolamine. The natural gas is passed through the amine solution which absorbs the hydrogen sulfide. The solution from the absorption equipment is passed to a stripping column where heat is applied to boil the solution and release the hydrogen sulfide. The lean, stripped solution is then passed to heat exchangers, and returned to the absorption equipment to again absorb hydrogen sulfide gas. The principle disadvantages of the amine system are its high operating cost, the corrosive nature of the absorbing liquid, its inability to remove mercaptans and water from gas streams, as well as its general inability to selectively remove hydrogen sulfide from carbon dioxide containing streams.

Selective physical adsorption of sulfur impurities on crystalline zeolite molecular sieves is another method for removing mercaptans and sulfur compounds from hydrocarbon streams. Both liquid phase and vapor phase processes have been developed. As used herein, a "physical adsorbent" is an adsorbent which does not chemically react with the impurities that it removes. A typical extraction process for the removal of sulfur from a hydrocarbon stream using a physical adsorbent comprises passing a sulfur-containing hydrocarbon stream through a bed of a molecular sieve adsorbent having a pore size large enough to adsorb the sulfur impurities, recovering the non-adsorbed effluent hydrocarbon until a desired degree of loading of the adsorbent with sulfur-containing impurities is obtained, and thereafter purging the adsorbent mass of hydrocarbon and regenerating the adsorbent by desorbing the sulfur-containing compounds therefrom. A patent to Collins (U.S. Pat. No. 3,654,144) is a representative example of this approach. In these processes the removal of $CO_2$ is not required to enhance sulfur removal from the feedstream.

Traces of carbon dioxide can be separated from hydrocarbon streams using zeolites having pore sizes in the range of 3 to 4 Angstroms. Typically, calcium zeolite A and treated alumina are used to remove carbon dioxide from hydrocarbon streams which contain ethylene, ethane and propane. Although these adsorbents efficiently adsorb carbon dioxide, they also strongly adsorb ethylene and propane. Fuel gases from refinery processes typically contain significant quantities of ethylene which reduce the effectiveness of calcium zeolite A and treated alumina in treating refinery fuel gases.

A patent to Chao et al. (U.S. Pat. No. 4,935,580) discloses the discovery that a natural clinoptilolite which has been ion-exchanged with metal cations selected from Li, Na, K, Ca, Mg, Ba and Sr is effective in the selective adsorption of minor amounts of $CO_2$ from light hydrocarbons having 1 to 5 carbon atoms. The method for separation using this adsorbent is especially useful for removal of traces of carbon dioxide from methane or other hydrocarbons. The clinoptilolite also removes water from the hydrocarbon. Chao (U.S. Pat. No. 4,964,889) discloses the use of the clinoptilolite adsorbent for the removal of nitrogen from methane in enhanced oil and gas recovery. Chao further discloses the use of the adsorbent in the separation of carbon monoxide from methane-containing reformer effluents. Chao and Rastelli (U.S. Pat. No. 4,935,580 and U.S. Pat. No. 5,045,515) disclose the use of the ion-exchanged natural clinoptilolite in the separation and removal of traces of carbon dioxide from ethylene or propylene used in the preparation of polyethylene or polypropylene. Chao and Rastelli also disclose the use of the adsorbent for the removal of carbon dioxide from methane or other hydrocarbons, for example, in steam reforming and butanes or butenes.

As environmental restrictions on sulfur emissions to the atmosphere and the disposal of liquid streams from the operation of petroleum refineries are made more stringent, there is a need for a process which will permit the continued use of light gases as fuels and other process uses within the refinery. This invention provides a means for the continued use of these light gases by the removal of mercaptan and sulfur compounds and by reducing a potential liquid stream disposal problem by minimizing the amount of spent alkaline solution created from the neutralization of acid gases and extraction of mercaptans.

SUMMARY OF THE INVENTION

The objective of the present invention is to reduce the total sulfur in a fuel gas stream to a very low level of total sulfur. Typical processing of fuel gas streams such as amine-based processing will remove $H_2S$ to a level of about 50 ppm-mol. However, these processes do not remove all of the sulfur compounds in the stream. After a typical amine process has removed $H_2S$, sulfur compounds such as alkyl mercaptans and COS still remain in the fuel gas. Applicant's process links a series of process steps which permit the reduction of the sulfur as indicated by the amount of $H_2S$ and sulfur compounds, such as alkyl mercaptans and COS in the fuel gas stream to a very low level. Preferably the very low level of sulfur remaining in the fuel gas stream will be less than 50 ppm-mol, and most preferably the very low level of sulfur will be less than 40 ppm-mol. The process is operated in an efficient and low cost fashion which minimizes the disposal of waste effluent.

Applicant has discovered a process for treating a feed gas stream containing $CO_2$, and one or more mercaptans by contacting the feed gas stream with a $CO_2$-selective adsorbent under conditions effective to produce a $CO_2$-depleted feed gas stream which is thereafter subjected to contact with an alkaline scrubbing solution under mercaptan absorption conditions effective to produce a mercaptan- and a $CO_2$-depleted product gas stream and a mercaptide-containing scrubbing solution. Mercaptan absorption processes are widely used in the oil refining and natural gas industries to remove the objectional materials before their subsequent use in fuels or other downstream processes which might be harmed by the presence of mercaptans. The major cost of operating the mercaptan removal process is the cost of using and disposing of the spent alkaline scrubbing solution. Typically the alkaline scrubbing solution is a weak solution of sodium hydroxide or ammonium hydroxide. By removing the $CO_2$ from a hydrocarbon feed gas comprising $CO_2$ prior to introducing the gas to the mercaptan removal zone, the amount of alkaline solution required to convert the mercaptans to mercaptides and neutralize acid gases such as $CO_2$, COS and $H_2S$ can be reduced significantly. Furthermore, the removal of $CO_2$ before the mercaptan removal zone unexpectedly improves the efficiency of the alkaline solution. It was found that with no $CO_2$ present in the feed gas, the alkaline solution can be used until it is 85% spent, while with $CO_2$ present, breakthrough of acid gases like $H_2S$ will occur when the alkaline is 35–45% spent.

In one embodiment, the Applicant's invention provides a process for the removal of mercaptan sulfur from a hydrocarbon feed gas stream comprising contacting the hydrocarbon feed gas stream with a $CO_2$-selective adsorbent at conditions effective to adsorb $CO_2$ to produce a $CO_2$-depleted feed gas stream containing at least 90% of the mercaptan sulfur in the hydrocarbon feed gas; contacting the $CO_2$-depleted feed gas stream with an alkaline scrubbing solution under mercaptan absorption conditions effective to produce a mercaptan-depleted product gas stream and a mercaptide-containing scrubbing solution; and recovering a mercaptan-depleted product gas stream from the process.

In another aspect, the process further comprises regenerating the $CO_2$-selective adsorbent with at least a portion of the mercaptan-depleted product gas stream, and oxidizing the mercaptide-containing scrubbing solution by contacting the mercaptide-containing scrubbing solution with an oxygen-containing gas in the presence of an oxidation catalyst.

In another embodiment, the invention provides a process for removing sulfur compounds selected from the group consisting of COS, $H_2S$, alkyl mercaptans or mixtures thereof from a hydrocarbon feed gas comprising $CO_2$ and water, the process comprising passing the hydrocarbon feed gas to a water removal zone and removing water from the hydrocarbon feed gas stream; passing a dewatered feed gas to an adsorption zone and contacting the dewatered feed gas with an adsorbent having a selectivity for the adsorption of $CO_2$ at $CO_2$ adsorption conditions to produce a $CO_2$-depleted feed gas stream; passing the $CO_2$-depleted feed gas stream to a mercaptan removal zone and contacting the $CO_2$-depleted feed gas stream with an alkaline scrubbing solution at absorption conditions to absorb mercaptans from said $CO_2$-depleted feed gas stream and produce a mercaptan- and $CO_2$-depleted product gas stream and a mercaptide-containing scrubbing solution; and, recovering the mercaptan- and $CO_2$-depleted product gas stream from the process.

DETAILED DESCRIPTION OF THE INVENTION

Hydrocarbon feed gas streams suitable for utilization in the process of the present invention include fuel gas streams available in a petroleum refinery, petrochemical plant, steel mill or power plant wherein the feed gas to be treated comprises acyclic hydrocarbons having 1 to 4 carbon number which contain trace amounts of $CO_2$, water, alkyl mercaptan, COS, and $H_2S$. Typically these streams are processed in an absorption process employing methylamine (MEA) or diethylamine (DEA) for primary removal of $H_2S$ and partial removal of COS. The removal of these sulfur compounds is not sufficient to meet more stringent sulfur limitations requiring the additional removal of mercaptan sulfur compounds from the hydrocarbon feed gas streams. Generally, the present invention is applicable to hydrocarbon feed mixtures containing from about 50 to 1000 ppm-volume mercaptan sulfur, containing 50 ppm-volume to 3% $CO_2$, more typically 50 to 1000 ppm-volume $CO_2$, containing 0.1 to 5.0% water, more typically 0.1 to 1.0% water, and containing 1 to 500 ppm-volume COS and $H_2S$. Some feeds derived from refining catalytic and thermal conversion processes such as fluid catalytic cracking and coking may contain small amounts of both ethylene and propylene in the range of 2 to 15% volume ethylene and 2 to 30% propylene.

One aspect of Applicant's process involves the removal of $CO_2$ from a fuel gas stream prior to the removal of mercaptan sulfur compounds from the fuel gas stream. This step improves the effectiveness of the mercaptan removal step and lowers the overall operating cost. Because the carbon dioxide does not degrade the final product, a portion of the adsorbed carbon dioxide can be returned to the treated product following the sulfur removal steps. The conventional alternative to this $CO_2$ removal and recombination is additional caustic treating in the presence of excess caustic, which results in the production of a waste stream which must be disposed of or processed for further treatment at additional cost. With Applicant's process, the total sulfur of the hydrocarbon gas stream can be reduced to less than about 50 ppm-mol and most preferably to less than 40 ppm-mol of total sulfur.

The process of the present invention is primarily intended for the removal of mercaptan sulfur from hydrocarbon feed gas streams. The process uses an adsorbent to adsorb $CO_2$ and thereby enhance the sulfur removal. The adsorbent is selective for the removal of carbon dioxide from a feed gas stream to produce a $CO_2$-depleted stream containing at least 90%, preferably 99%, and most preferably 99.5% of the mercaptan sulfur in the hydrocarbon feed gas stream. Such adsorbents with pore sizes in the range of 3 to 4 Å may be selected from natural and synthetic zeolitic molecular sieves, particularly clinoptilolite, and most preferably a natural clinoptilolite that has been ion-exchanged with metal cations selected from the group lithium, sodium, potassium, calcium, magnesium, barium, and strontium cations. Such clinoptilolites may be used without prior ion exchange, but results are variable. Clinoptilolite of particle size not more than 8 U.S. mesh having been ion-exchanged until at least 40, or preferably at least 60%, of the original cations have been replaced, for example, by sodium ions before being exchanged with the above metal cations is preferred. It has been found that the clinoptilolite ion-exchanged with potassium gives the best performance for the removal of $CO_2$ from methane or other hydrocarbons, and further that a particular clinoptilolite also removes water from the hydrocarbon. Other zeolites have been used for the separation of carbon dioxide from hydrocarbons, but these have been found to be inefficient. Patents to Chao, U.S. Pat. No. 4,964,889, and patents to Chao et al., U.S. Pat. Nos. 4,935,580 and 5,045,515, describe the composition of the preferred clinoptilolite adsorbent and the process of its preparation. Chao and Rastelli disclose that the clinoptilolite is effective for the removal of water from the hydrocarbons, especially if the hydrocarbons contain from 1 to 4 carbon numbers and are acyclic hydrocarbons.

The preferred operation of the $CO_2$-selective adsorbent is the adsorption of the $CO_2$ from a feed gas to provide an adsorber effluent containing at least 90% of the mercaptan sulfur in the feed gas. Preferably, less than 0.1 to 0.5 mol. % of mercaptan sulfur in the feed gas are adsorbed by the $CO_2$-selective adsorbent. In this way, the $CO_2$-selective adsorbent adsorbs $CO_2$ without adsorbing a substantial amount of mercaptans. Preferably, the adsorbent will be so selective that it will adsorb $CO_2$ and COS, without adsorbing $H_2S$ or mercaptans.

The $CO_2$-selective adsorbent is employed in vertical packed beds having a feed end and an effluent end. In principle, the flow of gas through the bed during the adsorption step may be from the top of the bed to the bottom or from the bottom to the top of the bed at adsorption conditions. Typically, it is preferred to pass the feed from the bottom to the top during adsorption. For the adsorption of $CO_2$ and water, the pressure prevailing in each one of the adsorption beds is generally in the range of 500 to 2200 kPa (72–320 psia). The temperature of the adsorption bed depends on the nature of the feed gas and the dew point of the feed gas. Typically, the temperature of the bed during adsorption ranges between 10° and 80° C., preferably between 20° and 50° C. Preferably the $CO_2$-depleted gas stream comprises less than 20 ppm-mol, and most preferably less than 10 ppm-mol of $CO_2$.

The mercaptan removal zone consists of the contacting of the $CO_2$-depleted gas stream with an alkaline scrubbing solution under mercaptan absorption conditions effective to produce a mercaptan- and a $CO_2$-depleted product gas stream and a mercaptide-containing scrubbing solution. The alkaline scrubbing solution may be selected from the group consisting of aqueous sodium hydroxide, aqueous potassium hydroxide, or mixtures thereof. The mercaptide-containing scrubbing solution is contacted with air or oxygen in the presence of an oxidation catalyst effective to regenerate the mercaptide-containing scrubbing solution. The temperature of the scrubbing solution ranges between 10° and 80° C., preferably between about 20° and 60° C. and a pressure generally in the range of 250 kPa absolute to 10,000 kPa absolute.

The oxidation catalyst of the instant invention is a metal chelate as disclosed in U.S. Pat. No. 5,064,525. In the oxidation step the mercaptide containing scrubbing solution is contacted with an oxygen-containing gas in the presence of the oxidation catalyst which may include an onium compound. Illustrative examples of the onium compound of the instant invention are disclosed in U.S. Pat. No. 5,064,525, which is herein incorporated by reference.

The metal chelate employed in the practice of this invention can be any of the various metal chelates known to the art as effective in catalyzing the oxidation of mercaptans contained in a sour hydrocarbon gas, to disulfides or polysulfides. The metal chelates include the metal compounds of tetrapyridinoporphyrazine described in U.S. Pat. No. 3,980,582, e.g., cobalt tetrapyridinoporphyrazine; porphyrin and metaloporphyrin catalysts as described in U.S. Pat. No. 2,966,453, e.g., cobalt tetraphenylporphyrin sulfonate; corrinoid catalysts such as described in U.S. Pat. No. 3,252,892, that is, cobalt corrin sulfonate; chelate organometallic catalysts such as described in U.S. Pat. No. 2,918,426, e.g., the condensation product of an aminophenol and a metal of group VIII; the metal phthalocyanines as described in U.S. Pat. No. 4,290,913, etc. As stated in U.S. Pat. No. 4,290,913, metal phthalocyanines are a preferred class of metal chelates. Cobalt phthalocyanine is the preferred metal phthalocyanine. All of the above cited U.S. Patent are incorporated by reference.

An optional component of the catalyst is an onium compound. An onium compound is an ionic compound in which the positively charged (cationic) atom is a non-metallic element other than carbon and which is not bonded to hydrogen. The onium compounds which can be used in this invention are selected from the group consisting of quaternary ammonium, phosphonium, arsonium, stibonium, oxonium and sulfonium compounds, that is, the cationic atom is nitrogen, phosphorus, arsenic, antimony, oxygen and sulfur, respectively. The use of onium compounds is described in U.S. Pat. No. 4,897,180 which is incorporated by reference.

The metal chelate component and the optional onium compound can be dispersed in any conventional or otherwise convenient manner. For example, the metal chelate may be dissolved in an aqueous solution which contains the basic component. When the metal chelate is dissolved in the aqueous solution, the process is referred to as a liquid-liquid process. If a liquid-liquid process is used the optional onium compounds described above may also be used to increase activity and/or durability.

Methods of effecting liquid-liquid oxidation are well known in the art and may be carried out in a batch or continuous mode. In a batch process the sour hydrocarbon fraction is introduced into a reaction zone containing the aqueous solution which comprises the metal chelate, the basic component and optional onium compound. Air, oxygen, or other oxygen-containing gases may be introduced therein. The reaction zone may be equipped with suitable stirrers or other mixing devices to obtain intimate mixing. In a continuous process the aqueous solution comprising the metal chelate basic component and optional onium compound is passed countercurrently or concurrently with the sour hydrocarbon fraction in the presence of a continuous stream of air. In a mixed type process, the reaction zone contains the aqueous solution, metal chelate basic component and optional onium compound, and hydrocarbon fraction and air are continuously passed therethrough. For specific examples of apparatus used to carry out a liquid-liquid process, see U.S. Pat. Nos. 4,019,869, 4,201,626 and 4,491,565 and 4,753,722 which are incorporated by reference. In the reaction zone the mercaptides are converted to disulfides and the alkaline scrubbing solution is regenerated. The effluent from the reactor zone comprising excess oxygen-containing gas, regenerated alkaline scrubbing solution, and disulfide is passed to a gas separator from which a vapor stream is removed. The reaction zone effluent is then passed to a coalescer to provide an aqueous scrubbing solution and a disulfide phase. The disulfide phase is separated by gravity and decanted or removed for sale or disposal. The aqueous scrubbing solution, substantially free of mercaptide and disulfide is returned to the mercaptan removal zone. Preferably, the amount of sulfur in the mercaptan depleted product gas is less than 50 ppm-mol, wherein the sulfur comprises at least one of $H_2S$, alkyl mercaptan, COS or mixtures thereof. When the hydrocarbon feed gas also contains organic sulfur compounds such as $CS_2$, an additional scrubbing step may be required to remove those organic sulfur compounds which are insoluble in the aqueous alkaline scrubbing solution. Preferably the scrubbing step will comprise the contacting of the mercaptan-depleted gas with a lean oil to provide a mercaptan-depleted product gas stream with a sulfur content less than 50 ppm-mol., sulfur and more preferably less than 40 ppm-mol., and most preferably less than 30 ppm-mol. sulfur.

The gas stream withdrawn from the mercaptan removal zone is depleted in both mercaptan sulfur and carbon dioxide. This stream may be removed as the product of the process. At least a portion of the $CO_2$- and mercaptan-depleted stream may be used to regenerate the $CO_2$-selective adsorbent. Typically, the $CO_2$- and mercaptan-depleted product gas is saturated with water as it leaves the mercaptan removal zone; and, preferably, it is first partially dried to improve its desorption capacity. This drying step may be carried out in an adsorber bed which has previously completed a $CO_2$ adsorption step. The dried, $CO_2$- and mercaptan-depleted gas is heated to desorption conditions by indirect heat exchange with feed gas.

The $CO_2$-selective adsorbent containing adsorbed $CO_2$ and in some cases water is purged with a heated $CO_2$- and mercaptan-depleted gas at desorption conditions. Typically, the desorption conditions comprise a temperature generally in the range of 80° to 120° C. and a pressure in the range of 500 to 1100 kPa (72–160 psia). The flow of the desorbent through the bed is the reverse of the flow for the adsorption step.

An alternative to the use of the same $CO_2$-selective adsorbent to remove both $CO_2$ and water prior to the removal of mercaptans, is the use of a separate sorbent for the removal of water in a feed gas dryer. The dryer can be used to remove water from the feed gas in amounts ranging from 0.1 to 5.0%, more typically less than 1%. This permits greater flexibility for operation of the process and the regeneration of the sorbent. The regeneration of the dryer bed can be integrated with the regeneration of the $CO_2$-selective adsorbent in a separate bed. The sorbent used in the dryer may be selected from the group consisting of silica gel, activated alumina, molecular sieves and zeolitic molecular sieves. The preferred adsorbent for use in the dryer of this invention is a molecular sieve with a 3 Å pore size, known as a 3 Å molecular sieve. The 3 Å sieve will permit the adsorption of the water molecules in the feed gas and generally exclude the adsorption of the larger hydrocarbon, $CO_2$, sulfur and alkyl mercaptan molecules. When a 3 Å molecular sieve adsorbent is employed as the sorbent in the dryer beds, the adsorption and desorption of the dryer bed and the $CO_2$-selective adsorption beds can be carried out at the same adsorption and desorption conditions.

The regeneration of the adsorbent comprises the heating of the mercaptan, $CO_2$- and water-depleted gas stream to provide a heated treated gas; introducing this heated treated gas to the effluent end of an adsorber bed; and withdrawing a $CO_2$- and water-containing treated product gas. The introduction of the heated treated gas continues for a period of 2 to 8 hours at desorption conditions to remove previously adsorbed $CO_2$ and water. At the conclusion of the desorption period, the treated gas is cooled. The cooling of the treated gas may be accomplished by passing the treated gas around the heater, cutting out the fuel or heat source to the heater, or in addition, by providing heat exchange or a gas cooler to further cool the treated gas. The cooled treated gas is passed through the bed until the temperature of the bed reaches the adsorption temperature.

After the regenerated bed has reached the adsorption temperature, it is isolated and repressurized with feed gas. The newly regenerated bed then is switched to removal service by the introduction of dewatered feed gas at the feed end. This raises the pressure of the bed to the adsorption pressure. The adsorbed bed which previously processed the dewatered feed is switched to the adsorption of water from the mercaptan- and $CO_2$-depleted gas stream and the adsorber bed previously in this service is switched to the regeneration mode and cycle begins again.

DETAILED DESCRIPTION OF THE DRAWINGS

The further description of the process of this invention is presented with reference to the attached figures, FIG. 1, FIG. 2, FIG. 3 and FIG. 4. The figures represent aspects of the invention and are not intended to be a limitation on the generally broad scope of the invention as set forth in the claims. Of necessity, some miscellaneous appurtenances including valves, pumps, separators, heat exchangers, etc. have been eliminated. Only those vessels and lines necessary for a clear and complete understanding of the process of the present invention are illustrated. In all cases, the process is a continuous process. The associated piping and manifolding for changing positions of the adsorbent vessels and the sequencing thereof is well known to those skilled in the gas adsorption art.

Figure 1:
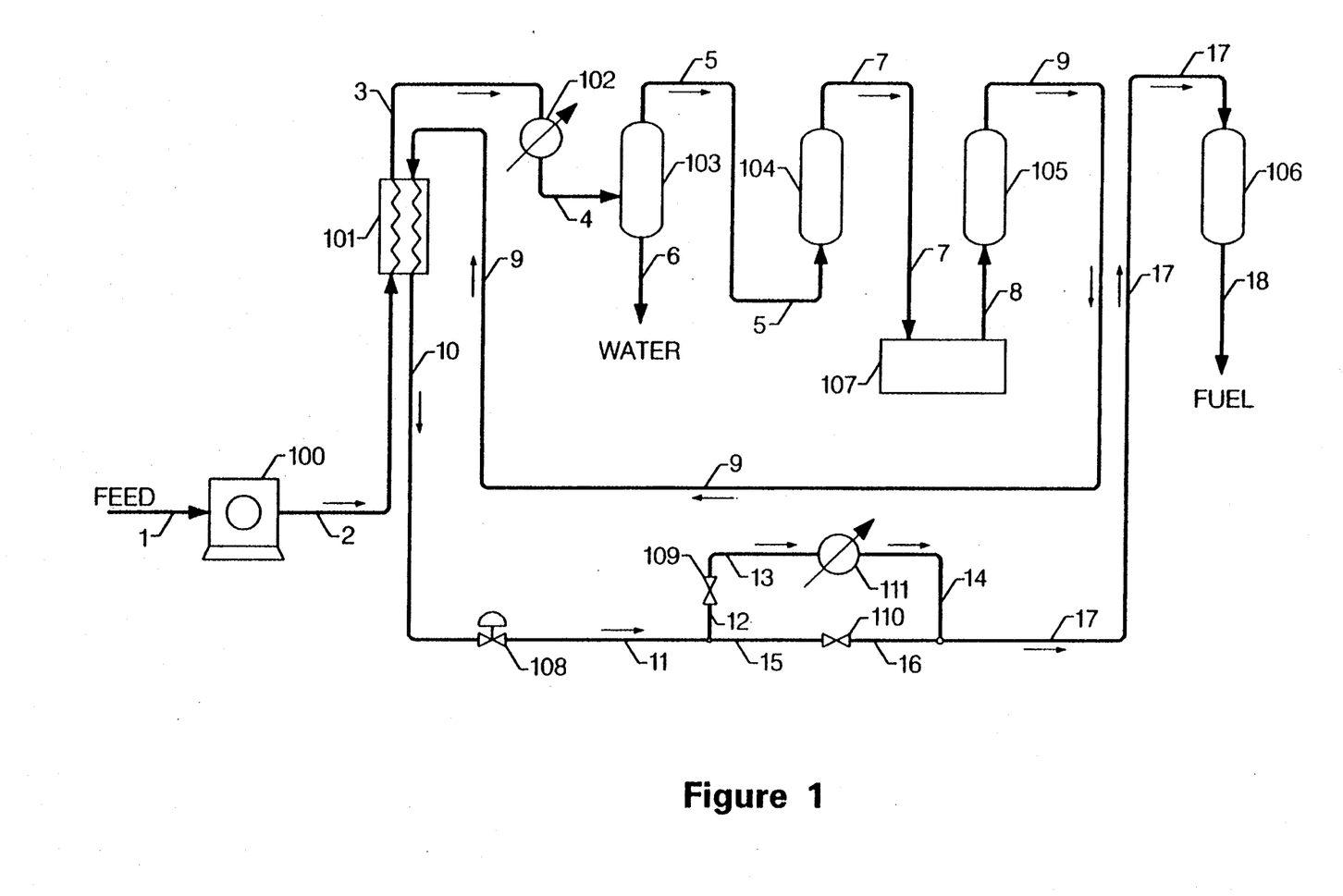
FIG. 1 is a schematic flow diagram of one embodiment of the present invention.

Referring to FIG. 1 which depicts the present invention in schematic form a feed gas stream 1 is introduced to compressor 100 and raised from a pressure of 965 kPa (140 psia) and a temperature of 40° C. (105° F.) to a pressure of 2,206 kPa (320 psia) and a temperature of 88° C. (190° F.) and discharged as stream 2. Stream 2, a compressed feed gas, is then introduced to a waste heat exchanger 101 wherein the compressed feed gas stream is cooled to a temperature in the range of 27° to 15° C. (80° to 60° F). This cooled feed gas stream 3 is then passed to exchanger 102 wherein it is further cooled to a temperature of 15° C. (60° F.) and discharged as stream 4. Stream 4, the further cooled feed gas is passed to a knockout drum 103 wherein liquid water is removed as stream 6 and the vapor portion, a dewatered feed gas is passed as stream 5 to the feed end of the first adsorber bed 104. The temperatures and pressures of the compression of the feed gas stream in compressor 100 and the subsequent reduction of the temperature of the feed gas stream through exchangers 101 and 102 is to provide a condition wherein any water within the feed gas stream will be condensed and subsequently removed in the knockout vessel 103. The absolute conditions will vary somewhat with the composition of the feed gas feedstream and the amount of water contained therein. Such temperatures and pressures are for causing the removal of the significant portion of the water from the feed gas stream are well known in the art and are conventionally used in chemical processing techniques.

The dewatered feed gas stream 5 now having had the major portion of the water removed in the previous steps enters the feed end of the first adsorber bed 104 containing an adsorbent and void spaces wherein carbon dioxide is adsorbed. A carbon dioxide depleted gas stream is passed from the effluent end of the first adsorber 104 via stream 7 to a mercaptan removal zone 107 wherein the gas stream is contacted with an alkaline scrubbing solution under mercaptan absorption conditions effective to produce a mercaptan- and a $CO_2$-depleted product gas stream and a mercaptide-containing scrubbing solution. The mercaptide-containing scrubbing solution is then contacted with air or oxygen in the presence of an oxidation catalyst effective to regenerate the mercaptide-containing scrubbing solution.

The mercaptan- and $CO_2$-depleted product gas stream of the mercaptan removal zone 107 is passed by stream 8 to the feed end of adsorber bed 105 wherein any water in stream 8 is adsorbed onto the adsorbent within adsorber bed 105. The dry treated product is passed via stream 9 to the waste heat exchanger 101 wherein it is heated to a temperature from 10° C. (50° F.) to approximately 80°–85° C. (180°–185° F.) to produce a heated dry treated product gas and passed in via line 10 to a pressure reducing valve 108. Pressure reducing valve 108 drops the pressure from approximately 2068 kPa (300 psia) to approximately 965 kPa (140 psia) to provide a low pressure heated gas in line 11. The low pressure heated dry treated gas is passed via lines 11, 15, 16 and 17, and valve 110 to the effluent end of a third adsorber bed 106. This third adsorber bed 106 is undergoing regeneration, wherein the low pressure heated dry treated gas is used to desorb the previously adsorbed carbon dioxide and water to produce a treated gas stream which is passed from the feed end of the adsorber via line 18, typically to a fuel system.

The regeneration of bed 106 continues for a period ranging from 2 hours to 10 hours, preferably 4 to 8 hours, during which time the $CO_2$ is removed from the bed and withdrawn with the treated product gas stream 18. At the conclusion of the regeneration period the product gas from line 11 is re-routed through line 12, valve 109 and line 13 to exchanger 111 wherein the temperature is reduced from approximately 80° C. (175° F.) to 43° C. (110° F.). This flow of cooled dry gas flows from exchanger 111 through lines 14 and 17 to bed 106. The flow of cooled dry gas is continued until the temperature in bed 106 has reached a temperature below 50° C., most preferably a temperature between 50° and 40° C. Typically, this cool down period requires 0.25 to 2 hours. At the completion of the regeneration cycle, the first adsorbent bed 104 is replaced with bed 106 and adsorbent bed 104 is moved to the second position replacing bed 105 which is now moved to the regeneration position. The adsorbent beds are cycled in this manner to provide a continuous operation of the overall system. The piping and valve manifolding to achieve this continuous operation is not shown in FIG. 1, but would be obvious to one skilled in the art.

Figure 2:
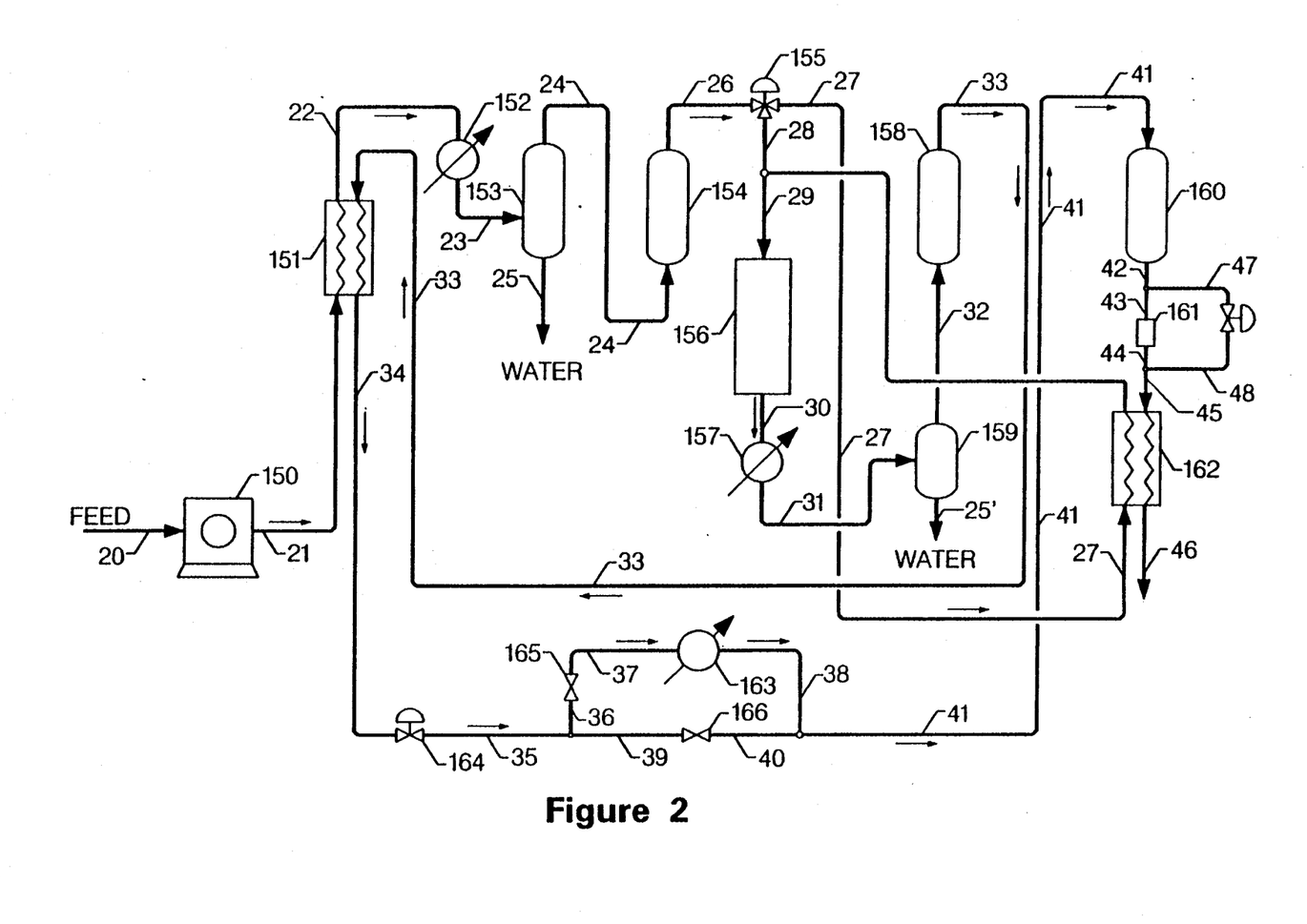
FIG. 2 is a schematic flow diagram showing modifications to the arrangement of FIG. 1 for improved energy efficiency.

FIG. 2 describes a system for the adsorption of carbon dioxide in a system similar to that of FIG. 1, further comprising a scheme for preheating the $CO_2$-depleted feed gas prior to the introduction to the mercaptan removal zone 156. This heating may be accomplished by a separate heater or by a scheme illustrated in FIG. 2 using waste heat recovery from a treated product gas stream 42. Referring to the diagram, the feed gas in stream 20 is passed to a compressor 150 at a temperature of 40° C. and a pressure of 965 kPa. Compressor 150 raises the pressure of the feed gas to approximately 2,206 kPa (320 psia), resulting in a temperature of approximately 85°–88° C. in a compressed feed gas stream 21. The compressed feed gas stream 21 is passed to a first waste heat exchanger 151 wherein its temperature is reduced to a temperature in the range of 10° to 20° C. (50°–70° F.) to provide a cooled feed gas stream and passed to a first heat exchanger 152 via stream 22 wherein the cooled feed gas stream is further cooled to a temperature in the range of 10°–15° C. (50°–60° F). The further cooled feed gas stream is passed from the first heat exchanger via stream 23 to a knockout chamber 153 wherein any condensed water is removed as a first water stream 25. The remaining vapor portion of the feed gas, or dewatered feed gas is passed via stream 24 to the feed end of a first adsorber bed 154, wherein carbon dioxide is selectively adsorbed on the sorbent without simultaneously adsorbing a significant amount of sulfur compounds on the sorbent. The effluent of the first adsorber bed comprising a $CO_2$-depleted gas is passed via stream 26 to a control valve 155 where, on temperature demand, a portion of the $CO_2$-depleted gas stream is passed via line 27 to a second waste recovery exchanger 162 and is returned as a heated $CO_2$-depleted gas at a temperature of approximately 15°–30° C. via stream 49. The remaining portion of stream 26 is passed through valve 155 via line 28 and admixed with the material in line 49 to comprise stream 29 and subsequently passed via line 29 to the mercaptan removal zone 156.

The mercaptan removal zone 156 operates as described in FIG. 1 above to first contact the heated feed gas stream with an alkaline scrubbing solution under mercaptan adsorption conditions effective to produce a mercaptan- and $CO_2$-depleted product gas stream and a mercaptide-containing scrubbing solution. The mercaptide scrubbing solution is subsequently regenerated by contacting the same with air or oxygen in the presence of an oxidation catalyst as described above. The effluent product from the mercaptan removal zone is passed via stream 30 to a second heat exchanger 157 wherein the mercaptan- and $CO_2$-depleted gas is chilled to a temperature of approximately 10° C. (50° F.) and passed to a second knockout chamber 159 via stream 31. In the second knockout chamber 159, any condensed water is removed via a second water stream 25' and the remaining vapor portion of the stream, or dewatered treated gas, is passed via line 32 to the feed end of a second adsorbent bed 158. The second adsorbent bed 158 is filled with the same adsorbent as the first adsorbent bed and selectively removes any remaining water vapor from stream 32. The dry treated gas stream is then passed via line 33 to the first waste recovery exchanger 151 wherein the temperature of the same is heated from 10° C. (50° F.) to approximately 80°–85° C. (180°–185° F.) and passed via line 34 as a heated dry treated gas stream to a pressure reduction valve 164 to provide a hot low pressure regeneration gas. Pressure reduction valve 164 reduces pressure from 2068 kPa to approximately 965 kPa. The hot, low-pressure regeneration gas continues via lines 35, 39, valve 166 and lines 40 and 41 to the effluent end of the third adsorbent bed 160. This third adsorbent bed 160 is undergoing regeneration of the adsorbent to remove previously adsorbed carbon dioxide and water from the sorbent. The treated product gas leaves the feed end of bed 160 via line 42 and passes via lines 43 and 44 through a heat accumulator 161 which absorbs heat from the product stream during the regeneration cycle or around the heat accumulator via lines 47 and 48 and valve 163 during the cooling step. The heat accumulator 161 acts to conserve energy within the process by absorbing heat from stream 43 during the desorption of bed 160 and returning the heat absorbed to stream 43 during the cooling step before bed 161 is repressurized with stream 24 and switched to $CO_2$ removal service. The treated gas stream is passed via lines 44 and 45 to the second waste heat exchanger 162. In the second waste heat exchanger the treated product gas stream temperature is reduced from approximately 80° to 65° C. by cross exchange with the effluent from the first adsorption bed in stream 27. The cooled treated product gas is then passed by lines 46 as the treated fuel product of the process.

At the completion of the regeneration step, valve 166 is closed and valve 165 is opened permitting the product gas in line 35 to pass through valve 165 via line 36 and continue via line 37 to a third exchanger 163 wherein the temperature of the treated gas is reduced from approximately 80° to approximately 40° C. This cooled low pressure regeneration gas is then passed via line 38 to line 41 to return adsorbent bed 160 to a temperature appropriate for its transition to carbon dioxide adsorption service. After the bed has reached an appropriate temperature ranging from 50°–40° C., the third adsorbent bed is placed in the first position and the first adsorbent bed is placed in the second position and the second adsorbent bed 158 is placed in the regeneration position. The sequencing and the changing positions of the adsorbent vessels is accomplished by means of a piping and manifolding system well known to those skilled in the art for a 3-bed adsorption system. All of the sequencing and switching of the adsorbent vessels is accomplished to maintain a continuous operation.

Figure 3:
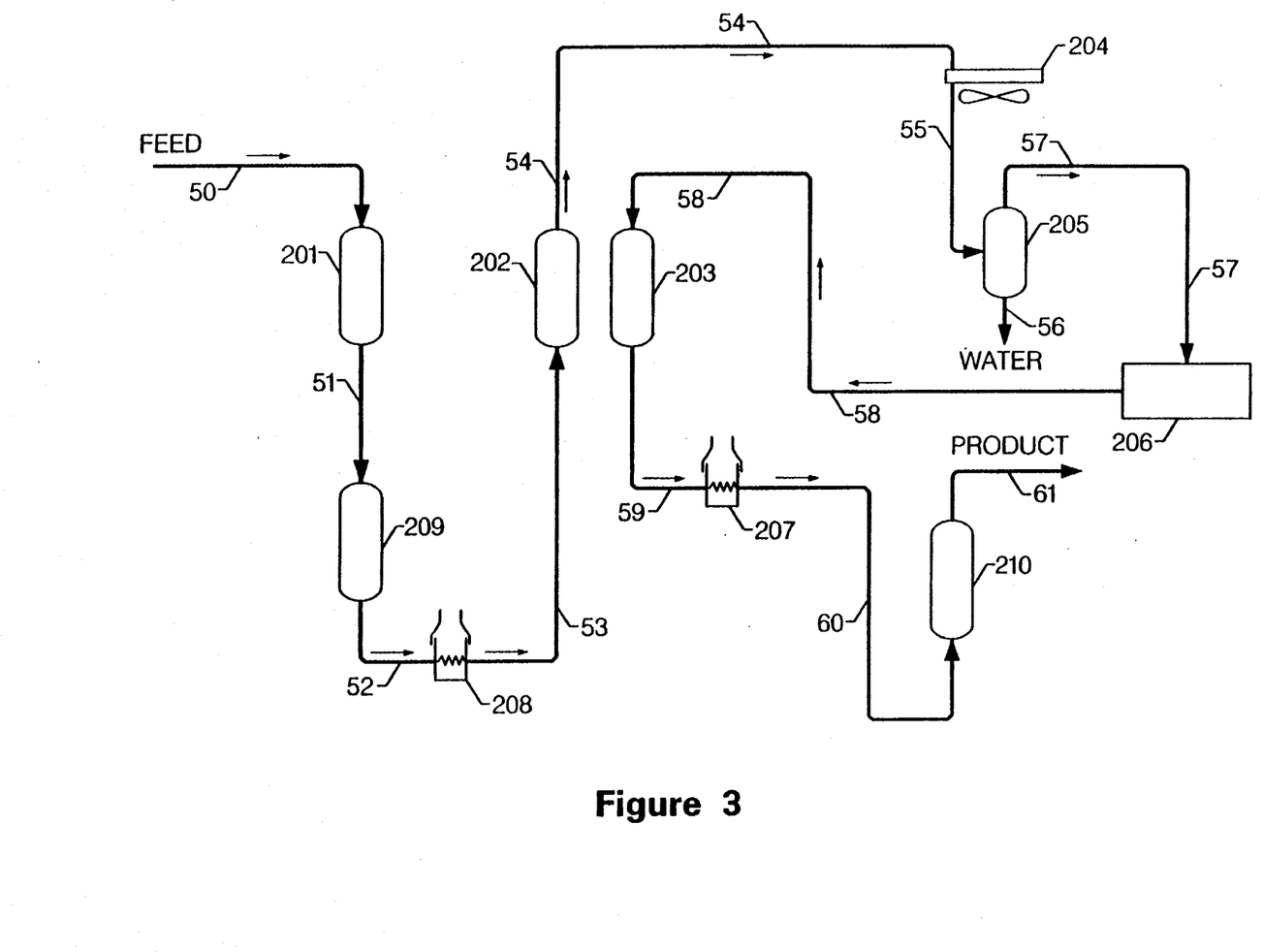
FIG. 3 is a schematic flow diagram showing an alternate arrangement of the process of the present invention that incorporates a 3-bed dryer and a 2-bed $CO_2$ adsorption section.

FIG. 3 illustrates another embodiment of the present invention incorporating a 3-bed dryer system operating in conjunction with a 2-bed $CO_2$ removal system. The 3-bed adsorber system contains a sorbent selected for the removal of water and may contain any of the appropriate sorbents for removing water from a hydrocarbon stream. The 2-bed $CO_2$ removal system contains the $CO_2$-selective adsorbent, preferably a potassium-exchanged clinoptilolite as hereinabove described. The use of the 3-bed adsorber system eliminates the need for the compression and heat exchange requirements of the scheme illustrated in FIGS. 1 and 2. A feed gas stream is passed via line 50 to the feed end of a first dryer bed 201 wherein water vapor is adsorbed on the sorbent, and the water-free effluent is passed via line 51 to the feed end of a first carbon dioxide adsorption bed 209. The carbon dioxide-free effluent of bed 209 is passed via line 52 to a heater 208 wherein the temperature is raised from a feed temperature of 40° C. (105° F.) and pressure of 965 kPa (7140 psia) to a temperature of approximately 220°–240° C. (428°–465° F.) and passed via line 53 as a heated $CO_2$-depleted gas stream to the effluent end of a second dryer bed 202 in regeneration mode to remove any adsorbed water from the sorbent and withdrawing a wet, $CO_2$-depleted gas stream is withdrawn from bed 202 and passed via line 54 to condensor 204. In condensor 204 the wet, $CO_2$-depleted gas stream is cooled to a temperature of between 10° and 45° C. to provide a cooled, wet, $CO_2$-depleted gas and passed via line 55 to knockout chamber 205, wherein any condensed water is removed via line 56 and the remaining vapor portion is passed via line 57 as a dewatered $CO_2$-depleted gas to a mercaptan removal zone 206. The mercaptan removal zone 206, as described hereinabove, comprises the contacting of the dewatered $CO_2$-depleted gas stream in line 57 with an alkaline scrubbing solution under mercaptan absorption conditions effective to produce a mercaptan- and $CO_2$-depleted gas stream and a mercaptide containing scrubbing solution, and regenerating the mercaptide-containing scrubbing solution by contacting the same with air or oxygen in the presence of an oxidation catalyst. The mercaptan- and $CO_2$-depleted gas stream is then passed by line 58 to the feed end of a third dryer bed 203 wherein water vapor accumulated in the mercaptan removal step is adsorbed on the sorbent contained within the dryer bed 203. The dry treated gas from the third dryer bed 203 is passed to a heater 207 via line 59 wherein the temperature is raised to approximately 80°–85° C. to provide a heated dry treated gas stream and passed via line 60 to the effluent end of a second $CO_2$-adsorber bed 210. The second $CO_2$-adsorber bed 210 is undergoing regeneration for the removal of adsorbed $CO_2$ from the $CO_2$-selective adsorbent. Typically, the regeneration of the $CO_2$-selective adsorbent takes place over a temperature range of 80°–120° C. and a pressure range of from 500 to 2000 kPa. The $CO_2$ is desorbed and combined with the heated dry treated gas to provide the product gas stream 61. Although not shown in FIG. 3, the process includes associated piping and manifolding to permit the continuous operation of the system. Adsorber bed 209, for the adsorption of carbon dioxide without the co-adsorption of sulfur compounds is operated alternately with adsorber bed 210 such that one bed is on adsorption while the other bed is on regeneration. The regeneration time requires between 2 and 10 hours, preferably 2 to 8 hours to complete a single cycle. The dryer beds 201, 202 and 203 operate on a cycle time which requires between 2 and 8 hours to complete each step. The dryer beds are sequenced as well to operate in a continuous manner.

Figure 4:
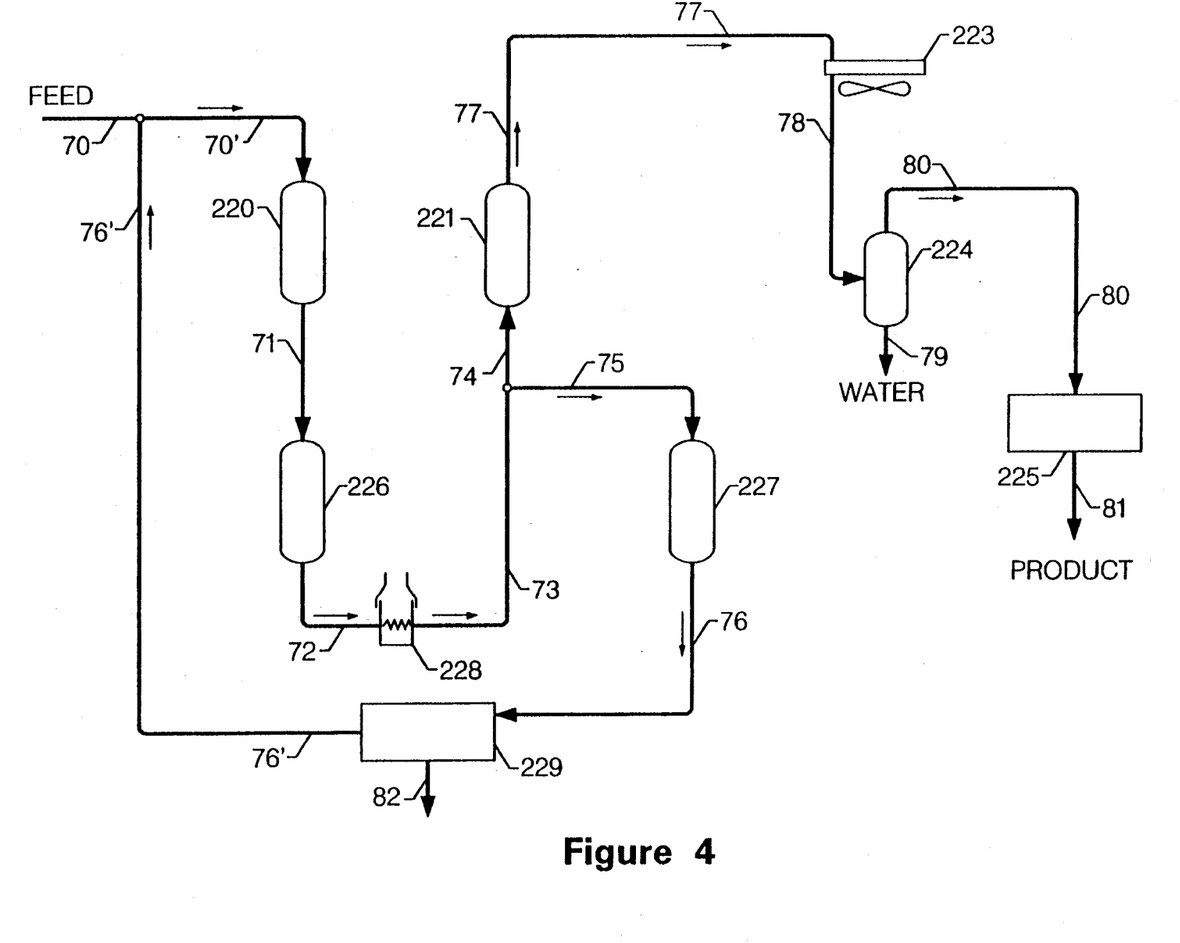
FIG. 4 is a schematic flow diagram showing a variation of the arrangement in FIG. 3 which employs a 2-bed dryer.

FIG. 4 illustrates the operation of the invention in another embodiment employing 2 dryer beds and 2 beds for the removal of $CO_2$, COS, and $H_2S$. In this scheme, a feed gas comprising fresh feed 70 and a recycle stream 76' are admixed and introduced to the system via line 70' at a temperature of 40° C. and 965 kPa. Stream 70 is introduced to dryer bed 220 at the feed end wherein water is removed from the combined feed gas stream over a sorbent selective for the adsorption of water. A dry combined feed gas is withdrawn from the effluent end of the dryer bed 220 and passed via line 71 to the feed end of a first adsorber bed 226 containing an adsorbent selective for the removal or adsorption of $CO_2$, COS, and $H_2S$ without the adsorption of any alkyl mercaptans, or preferably removing less than 0.1 mol. % mercaptan sulfur. The preferred adsorbent for the selective adsorption of $CO_2$, COS, and $H_2S$ is a molecular sieve, preferably a 3 Å molecular sieve, partially exchanged with a cation selected from the group Li, Na, K, Ca, Ma, Ba and Sr, and most preferably a 4 Å molecular sieve that has been partially exchanged with a cation selected from the group Na, K and Ca. A mercaptan-containing gas is withdrawn from the effluent end of the first adsorber bed 226 by line 72 and passed to a heater 228 wherein the mercaptan-containing gas stream is heated to a temperature of 230°–235° C. to provide a heated mercaptan-containing gas stream. The heated mercaptan-containing gas is then passed via lines 73 and 74 to the effluent end of dryer bed 221 wherein the water previously adsorbed is desorbed to provide a wet mercaptan-containing gas. The wet mercaptan-containing gas is withdrawn from the effluent end of dryer 221 and passed via line 77 to condensor 223. Condensor 223 reduces the temperature of the wet mercaptan-containing gas stream to approximately 40°–45° C. to provide a cooled wet mercaptan-containing gas. The cooled wet mercaptan-containing gas is passed via line 78 to a knockout vessel 224, wherein any condensed water is removed via line 79 and the remaining dewatered mercaptan containing gas is passed via line 80 to a mercaptan removing zone 225.

The mercaptan removing zone 225 as described above comprises the contacting of the $CO_2$-depleted stream containing one or more mercaptans with an alkaline scrubbing solution under mercaptan absorption conditions effective to produce a mercaptan-depleted product gas stream 81 and a mercaptide-containing scrubbing solution. The process 225 further comprises regenerating the mercaptide-containing scrubbing solution by contacting same with oxygen in the presence of an oxidation catalyst as hereinabove described.

At least a portion of the heated mercaptan containing stream 73 is passed via line 75 to the effluent end of a second adsorber bed 227 to effectively desorb $CO_2$, COS, and $H_2S$ from the sorbent. Typically this portion ranges from 5–20% of the fresh feed to the complex. A stream comprising mercaptan and $CO_2$ is withdrawn via line 76 from the feed end of the adsorber 227. The stream 76 is further processed in an amine treatment unit 229 to absorb the $CO_2$, COS, and $H_2S$ which are withdrawn by line 82. The remaining hydrocarbon gas portion from unit 229 is returned as the recycle 76' to be combined with the feed 70 and passed to the first dryer bed 220 of this process in stream 70'.

The 2 dryer beds and the 3 $CO_2$, COS, and $H_2S$-adsorber beds operate in a continuous manner by alternating between adsorption and regeneration. The sequencing and the alternating of adsorbent vessels and dryers is accomplished by means of a piping an manifolding system well known to those skilled in the art.

What is claimed is:

1. A process for removing mercaptan sulfur from a hydrocarbon feed gas stream comprising $CO_2$, $H_2S$, and water comprising the following steps:
    a) separating water from the hydrocarbon feed gas stream to produce a dewatered feed gas stream;
    b) passing the dewatered feed gas stream to a first bed containing a regenerated $CO_2$- and water-selective adsorbent and contacting said dewatered feed gas stream at adsorption conditions to adsorb $CO_2$ in said first bed for the removal of $CO_2$ and withdrawing a $CO_2$-depleted gas stream containing at least 90% of said mercaptan sulfur in said hydrocarbon feed gas stream from said first bed;
    c) prewashing the $CO_2$-depleted feed gas stream with an aqueous caustic solution to remove trace acidic compounds comprising carbon dioxide and $H_2S$ and passing the $CO_2$-depleted gas stream to a mercaptan removal zone and contacting the $CO_2$-depleted gas stream with an alkaline scrubbing solution at conditions to absorb mercaptans and producing a mercaptan- and $CO_2$-depleted gas stream and a mercaptide-containing scrubbing solution;
    d) passing the mercaptan- and $CO_2$-depleted gas stream to a second bed of a $CO_2$- and water-selective adsorbent containing adsorbed $CO_2$ and contacting said mercaptan- and $CO_2$-depleted gas stream at adsorption conditions to adsorb water in said second bed and withdrawing a dry treated gas stream from the second bed;
    e) heating the dry treated gas stream to provide a heated dry treated gas stream and passing the heated dry treated gas stream to a third bed of a $CO_2$- and water-selective adsorbent containing adsorbed $CO_2$ and water at desorption conditions to desorb $CO_2$ and water from said third bed and to provide a regenerated bed of $CO_2$- and water-selective adsorbent; and
    f) withdrawing a $CO_2$-containing and mercaptan-depleted product gas stream from said third bed said product gas stream having a total sulfur content less than 50 ppm-mol.

2. The process of claim 1 wherein the passage of the heated dry treated gas to said third bed is followed by the passage of a cooled dry gas stream to said third adsorber bed.

3. The process of claim 1 wherein the pressure of the heated dry treated gas stream is reduced before it is passed to the third bed in step (e).

4. The process of claim 1 further comprising the following steps:
    heating at least a portion of the $CO_2$-depleted gas stream by indirect heat exchange with said $CO_2$-containing and mercaptan-depleted product gas stream prior to passing said $CO_2$-depleted gas stream to the mercaptan removal zone; and,
    condensing water from said mercaptan- and $CO_2$-depleted gas stream prior to passing said mercaptan- and $CO_2$-depleted gas stream to said second adsorber bed.

5. The process of claim 1 wherein said $CO_2$- and water-selective adsorbent is a modified clinoptilolite adsorbent said modified clinoptilolite being a natural clinoptilolite that has been ion-exchanged with a metal cation selected from the group consisting of lithium, sodium, potassium, calcium, magnesium, barium, and strontium.

* * * * *